US008753498B2

(12) United States Patent
Chuang et al.

(10) Patent No.: US 8,753,498 B2
(45) Date of Patent: Jun. 17, 2014

(54) OPEN OPTOELECTROWETTING DROPLET ACTUATION DEVICE AND METHOD

(75) Inventors: Han-Sheng Chuang, Taipei (TW); Aloke Kumar, Kolkata (IN); Steven T. Wereley, West Lafayette (IN)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 13/380,256

(22) PCT Filed: Jun. 25, 2010

(86) PCT No.: PCT/US2010/040031
§ 371 (c)(1), (2), (4) Date: Dec. 22, 2011

(87) PCT Pub. No.: WO2010/151794
PCT Pub. Date: Dec. 29, 2010

(65) Prior Publication Data

US 2012/0091003 A1 Apr. 19, 2012

Related U.S. Application Data

(60) Provisional application No. 61/220,392, filed on Jun. 25, 2009.

(51) Int. Cl.
*B01D 57/02* (2006.01)

(52) U.S. Cl.
USPC .......... 204/600; 204/450

(58) Field of Classification Search
USPC .......... 204/450–470, 546–550, 600–621, 204/641–645
See application file for complete search history.

(56) References Cited

U.S. PATENT DOCUMENTS

| | | | | |
|---|---|---|---|---|
| 3,801,317 | A | 4/1974 | Tanaka et al. | |
| 6,911,132 | B2 * | 6/2005 | Pamula et al. | 204/600 |
| 6,958,132 | B2 | 10/2005 | Chiou et al. | |
| 7,508,566 | B2 | 3/2009 | Feenstra et al. | |
| 2006/0146099 | A1 | 7/2006 | Wang et al. | |
| 2006/0165565 | A1 * | 7/2006 | Ermakov | 422/130 |
| 2007/0095669 | A1 * | 5/2007 | Lau et al. | 204/547 |
| 2008/0038810 | A1 | 2/2008 | Pollack et al. | |
| 2009/0170186 | A1 * | 7/2009 | Wu et al. | 435/286.1 |

FOREIGN PATENT DOCUMENTS

| | | | |
|---|---|---|---|
| WO | WO 2005/000970 | A1 | 1/2005 |
| WO | WO 2005/001120 | A1 | 1/2005 |
| WO | WO 2005/001121 | A1 | 1/2005 |
| WO | WO 2006/094356 | A1 | 9/2006 |

OTHER PUBLICATIONS

G. J. Shah, Electrowetting on dielectric (EWOD) for Biochemical Applications: Particle Manipulation for Separation in Droplet Microfluidics, University of California (2008).*

(Continued)

*Primary Examiner* — Luan Van
*Assistant Examiner* — Maris R Kessel
(74) *Attorney, Agent, or Firm* — Maginot, Moore & Beck LLP

(57) ABSTRACT

An open optoelectrowetting (o-OEW) device for liquid droplet manipulations. The o-OEW device is realized by coplanar electrodes and a photoconductor. The local switching effect for electrowetting resulting from illumination is based on the tunable impedance of the photoconductor. Dynamic virtual electrodes are created using projected images, leading to free planar movements of droplets.

15 Claims, 9 Drawing Sheets

(56) References Cited

OTHER PUBLICATIONS

Zeng, J. et al., "Principles of Droplet Electrohydrodynamics for Lab-On-A-Chip," *Lab on a Chip*, No. 4, 2004, pp. 265-277.
Velev, O. et al., "On-Chip Manipulation of Free Droplets," *Nature*, vol. 426, No. 6966, Dec. 4, 2003, pp. 515-516.
Kotz, K. et al., "Optically Addressed Droplet-Based Protein Assay," *Journal of the American Chemical Society*, vol. 127, No. 16, pp. 5736-5737.
Sun, R. et al., "Photoinduced Surface Wettability Conversion of ZnO and TiO2 Thin Films," *The Journal of Physical Chemistry B*, vol. 105, No. 10, Mar. 15, 2001, pp. 1984-1990.
Beyssen, D. et al., "Microfluidic Device Based on Surface Acoustic Wave," *Sensors and Actuators B: Chemical*, vol. 118, No. 1-2, Oct. 25, 2006, pp. 380-385.
Moon, H. et al., "Low Voltage Electrowetting-On-Dielectric," *Journal of Applied Physics*, vol. 92, No. 7, Oct. 1, 2002, pp. 4080-4087.
Cho, S. et al., "Particle Separation and Concentration Control for Digital Microfluidic Systems," *IEEE The Sixteenth Annual International Conference on Micro Electro Mechanical Systems*, Jan. 19-23, 2003, Kyoto, Japan, pp. 686-689.
Fan, S-K. et al., "Manipulation of Multiple Droplets on NxM Grid by Cross-Reference EWOD Driving Scheme and Pressure-Contact Packaging," *IEEE The Sixteenth Annual International Conference on Micro Electro Mechanical Systems*, Jan. 19-23, 2003, Kyoto, Japan, pp. 694-697.
Chiou, P-Y et al., "Droplet Manipulation With Light on Optoelectrowetting Device," *Journal of Microelectromechanical Systems*, vol. 17, No. 1, Feb. 2008, pp. 133-138.
Inui, N., "Relationship Between Contact Angle of Liquid Droplet and Light Beam Position in Optoelectrowetting," *Sensors and Actuators A: Physical*, vol. 140, No. 1, Oct. 1, 2007, pp. 123-130.
U.S. Appl. No. 12/261,622, filed Oct. 30, 2008, Williams et al.
U.S. Appl. No. 12/404,866, filed Mar. 16, 2009, Kumar et al.
Chuang, H. et al., "Open Optoelectrowetting Droplet Actuation," *Applied Physics Letters*, vol. 93, No. 6, Aug. 14, 2008, pp. 064104-1-064104-3.
Kotz, K., et al., "Optical Microfluidics," *Applied Physics Letters*, vol. 85, No. 13, Sep. 27, 2004, pp. 2658-2660.
Lee, M., et al, "Development of a Non-Continuous Micro-Flow Opto-Wetting Droplet Manipulation Technology," *Biomedical Engineering: Applications, Basis and Communications*, vol. 17, No. 6, Dec. 25, 2005, pp. 293-299.
Cooney, C., et al., "Electrowetting Droplet Microfluidics on a Single Planar Surface," *Microfluidics and Nanofluidics*, vol. 2, No. 5, Sep. 1, 2006, pp. 435-446.
Torkkeli, Altti, "Droplet Microfluidics on a Planar Surface," Doctoral Dissertation, Helsinki University of Technology, Espoo, Finland, 2003, 214 pgs.
Wu, J. et al., "Design, Simulation and Fabrication of Electrowetting-Based Actuators for Integrated Digital Microfluidics," *Proceedings of the 1st IEEE International Conference on Nano/Micro Engineered and Molecular Systems*, Jan. 18-21, 2006, Zhuhai, China, pp. 1097-1100.
Yi, U. et al., "Characterization of Electrowetting Actuation on Addressable Single-Side Coplanar Electrodes," *Journal of Micromechanics and Microengineering*, vol. 16, No. 10, Oct. 2006, pp. 2053-2059.
Chiou, P-Y. et al., "Light Actuation of Liquid by Optoelectrowetting," *Sensors and Actuators A: Physical*, vol. 104, No. 3, May 15, 2003, pp. 222-228.
Australian Biotechnology, Director of Australian Biotech, [online] ©Ausbiotech, [retrieved Jun. 21, 2010]. Retrieved from the Internet: http://www.ausbiotech.org/directory/details.asp?companyid=%7BB0F855AC-C807-43B4-AADB-6AC54143197B%7D&returntour1=%2Fdirectory%2Fsearch.asp%3Fpg%3D36, 3 pgs.
Park, S. et al., "Light-Driven Microfluidic Platforms for Droplet-Based Biochemical Analysis," *Optical Trapping and Optical Micromanipulation VI.*, Dholakia, Kishan; Spalding, Gabriel C., Eds., *Proceedings of the SPIE*, Aug. 2-6, 2009, San Diego, CA, vol. 7400., pp. 74000U-1-74000U-10.
International Search Report and Written Opinion dated Sep. 10, 2010, in PCT Application No. PCT/US2010/040031 (8 pgs).
Cho, S. et al., "Creating, Transporting, Cutting, and Merging Liquid Droplets by Electrowetting-Based Actuation for Digital Microfluidic Circuits," *Journal of Microelectromechanical Systems*, vol. 12, No. 1, Feb. 2003, pp. 70-80.
Pollack, M. et al., "Electrowetting-Based Actuation of Liquid Droplets for Microfluidic Applications," *Applied Physics Letters*, vol. 77, No. 11, Sep. 11, 2000, pp. 1725-1726.
Teh, S. et al., "Droplet Microfluidics," *Lab on a Chip*, No. 8, 2008, pp. 198-220.
Wang, K-L. et al., "Dynamic Control of DEP Actuation and Droplet Dispensing," *Journal of Micromechanics and Microengineering*, vol. 17, No. 1, Jan. 2007, pp. 76-80.
Sukhanova, A. et al., "Lab-In-A-Drop: Controlled Self-Assembly of CdSe/ZnS Quantum Dots and Quantum Rods Into Polycrystalline Nanostructures With Desired Optical Properties," *Nanotechnology*, vol. 18, No. 18, May 9, 2007, 8 pgs.
Chang, Y-H. et al., "Integrated Polymerase Chain Reaction Chips Utilizing Digital Microfluidics," *Biomedical Microdevices*, vol. 8, No. 3, Sep. 1, 2006, pp. 215-225.
Chiou, P-Y. et al., "Massively Parallel Manipulation of Single Cells and Microparticles Using Optical Images," *Nature*, vol. 436, No. 7049, Jul. 21, 2005, pp. 370-372.

* cited by examiner

OPEN OPTOELECTROWETTING DROPLET ACTUATION DEVICE AND METHOD

CROSS-REFERENCE TO RELATED APPLICATION

This application claims the benefit of Provisional Patent Application No. 61/220,392, filed Jun. 25, 2009, which application is hereby incorporated by reference.

GOVERNMENT RIGHTS

This invention was made with U.S. government support under Contract/Grant No. CCF-0726821 awarded by the National Science Foundation. The U.S. government may have certain rights in the invention.

BACKGROUND OF THE INVENTION

Digital microfluidics has been emerging as a promising development in lab-on-a-chip (LoC) systems [1-5]. A variety of droplet actuation methods have been conducted, including thermal Marangoni effect [6], photosensitive surface treatment [7], surface acoustic wave [8], liquid dielectrophoresis [9] and electrowetting [10, 16-19]. Among these techniques, electrowetting draws attention due to its high performance, reliability, simplicity and fast response. Based on the droplet manipulation, one is able to integrate different cumbersome laboratory operations in a microliter liquid, called lab-in-a-drop [11]. Increasing numbers of assays have benefited from this innovation, such as polymerase chain reaction (PCR) [12] and cell sorting [13]. Lately, addressable electrowetting has been exploited to extend the technique [14]. An optoelectrowetting (OEW) approach proposed by Chiou et al. employs a photoconductor, making "virtual electrodes" [15]. The electrodes are generated dynamically with projected images, realizing multi-droplet and programmable manipulations. A voltage is applied across two parallel plates, one above and one below a droplet in a closed configuration which seriously inhibits integrating additional components or extensibility.

SUMMARY OF THE INVENTION

The present invention provides an open configuration of an optoelectrowetting (OEW) device which compensates for deficiencies of closed configurations and lends itself to a complete lab-on-a-chip (LoC) system.

One aspect of the present invention is an open optoelectrowetting (OEW) device for liquid droplet actuation, comprising a conductive layer with a plurality of substantially coplanar driving and reference electrodes in an interdigitated alternating pattern on a substrate, the plurality of driving electrodes being electrically connected in parallel and the plurality of reference electrodes being electrically connected in parallel for connection to respective terminals of an AC voltage source. The device includes a photoconductive layer on the conductive layer, a dielectric layer on the photoconductive layer, and a hydrophobic layer on the dielectric layer.

The objects and advantages of the present invention will be more apparent upon reading the following detailed description in conjunction with the accompanying drawings.

BRIEF DESCRIPTION OF THE DRAWINGS

FIG. 2A shows the initial state before illumination. The droplet maintains a high contact angle and the principal voltage drop falls within the photoconductive layer. FIG. 2B shows the excited state after illumination. The impedance of the photoconductor is significantly reduced, shifting the major voltage drop to the insulator. The contact angle decreases in response to the change, enabling the droplet to move.

FIG. 6A shows multidirectional actuation on an open surface. The droplet initially moves up and to the left followed by movement down and to the left. FIG. 6B shows a laser spot in the middle of the two droplets, causing both droplets to wet the illuminated surface and merge together. FIG. 6C shows three laser beams shone on three separate droplets and the droplets simultaneously actuated.

FIG. 7A shows droplet translation; FIG. 7B shows droplets merging, FIG. 7C shows oil translation and merging by a droplet and FIG. 7D shows oil splitting by a droplet.

DESCRIPTION OF PREFERRED EMBODIMENTS

Figure 1:
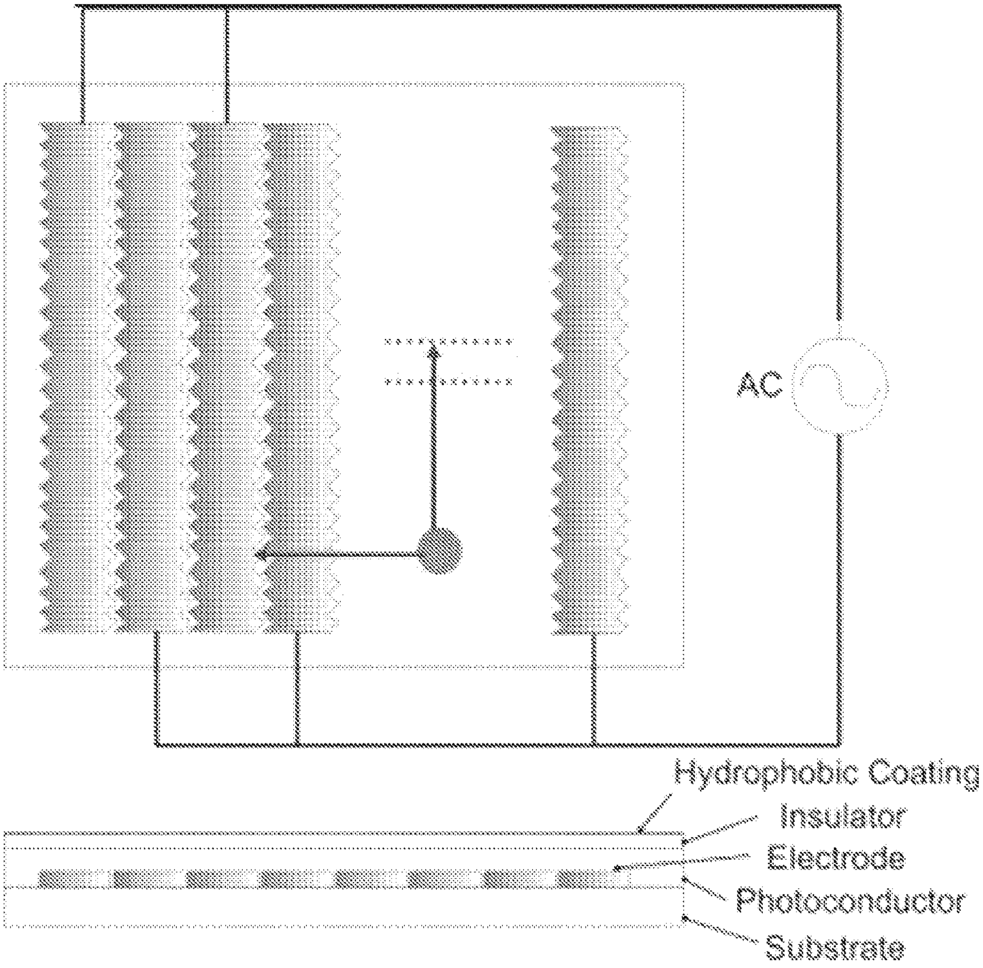
FIG. 1 shows a schematic diagram of an embodiment of the chip layout. The electrodes are arranged in an alternating pattern of reference electrodes and driving electrodes. The interdigitated edges are used to decrease the discontinuity due to the gap. From the bottom to the top, the materials are glass substrate, titanium (Ti) electrodes, amorphous silicon (a-Si) photoconductor, silicon dioxide ($SiO_2$) insulator, and Teflon hydrophobic coating.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

A first embodiment of an open optoelectrowetting (o-OEW) device or chip in accordance with the present invention is shown in FIG. 1. A fabrication process for this o-OEW chip is briefly described as follows: First, a positive photoresist (Hoechst Celanese, AZ4620) is spun on a 4" glass wafer (Corning, 1737F) and followed by a photolithography. Second, 1000-Å titanium (Ti) is deposited on the top of the wafer using e-beam evaporation and then patterned by means of lift-off to form electrodes. Subsequently, 450-nm amorphous silicon (a-Si) and 115-nm $SiO_2$ are deposited using a plasma enhanced chemical vapor deposition (PECVD) system. The a-Si works as a photoconductor while the $SiO_2$ works as an insulator in the chip. A hydrophobic coating of thickness less than 50 nm is spun on the top surface with 1% diluted Teflon (DuPont, AF1600®).

The o-OEW device has driving and reference electrodes patterned alternately, such that subcircuit loops are formed when a droplet rolls over them. One side of the droplet experiences a reduced contact angle due to the illumination; and the other side maintains a high contact angle in the dark. The driving and reference electrodes are connected to respective terminals of an AC current source. The electrodes may be elongate and arranged in a single row. In such configuration the number and width of electrodes will determine the maximum possible x-axis actuation while the length of the elongate electrodes will determine the maximum possible y-axis actuation. Actuation is not constrained to one axis of the device. The arrows in FIG. 1 illustrate that the droplet can be actuated in the x or y direction. The interdigitated design or jigsaw edge aims to increase the contact surface and minimize the discontinuity due to the gap. The driving and reference electrodes are substantially coplanar.

Figure 2:
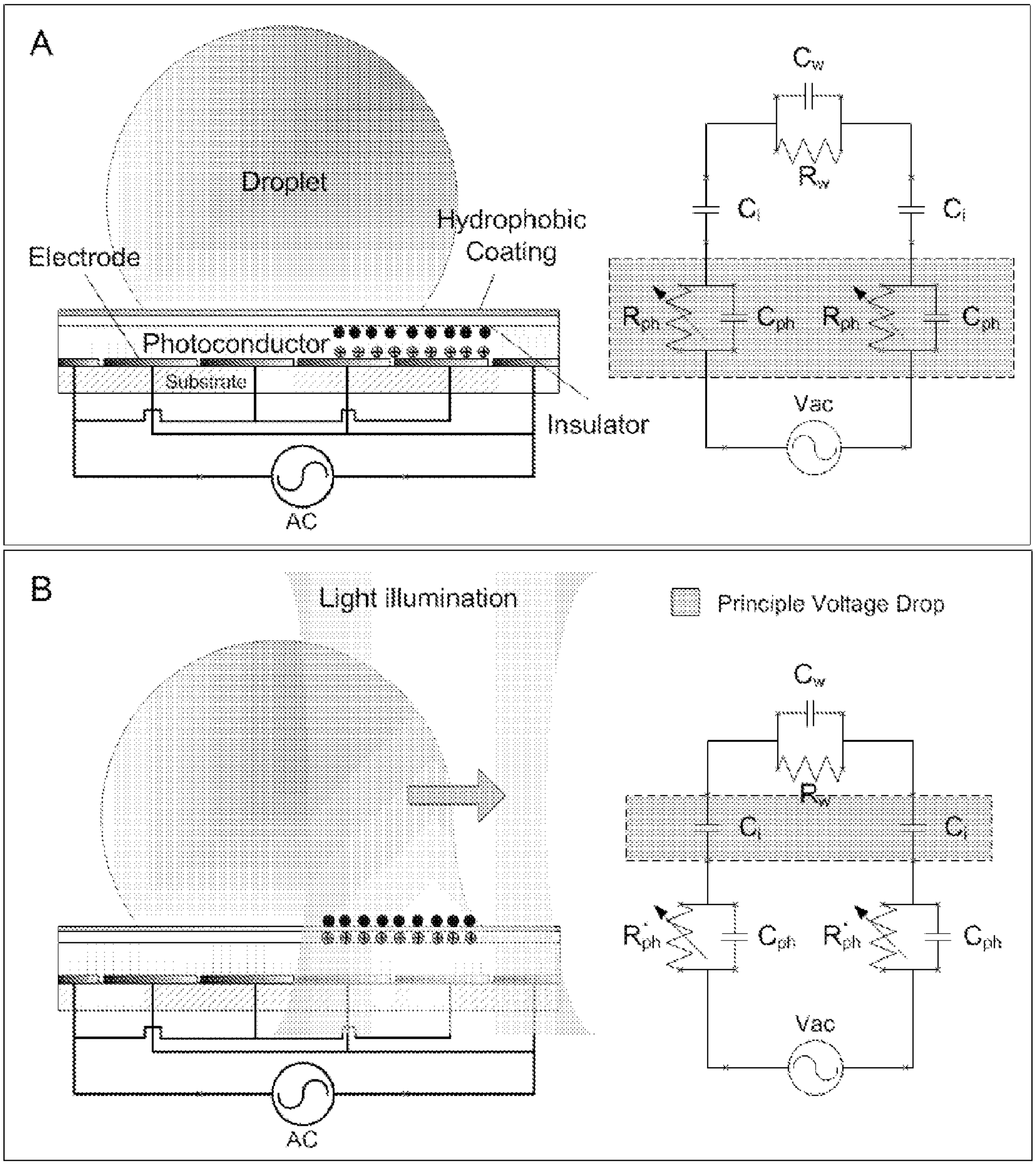
FIG. 2 is a schematic diagram showing the mechanism of the open OEW.

FIG. 2 illustrates the mechanism behind o-OEW. For each pair of electrodes under the droplet, a closed circuit is formed which runs from the AC voltage source through one electrode, the photoconductive layer, the insulator or dielectric layer, and the droplet, and then through an adjacent portion of the insulator and photoconductive layers, and the other electrode, to the AC voltage source. The photoconductor acts as a light-sensitive variable impedance, and the insulator or dielectric layer acts as a capacitor. For such a circuit loop on the dark (non-illuminated) side of the droplet, the photoconductor impedance substantially exceeds that of the insulator and thus the principal voltage drop is across the photoconductor, and the droplet maintains a high contact angle, i.e., the angle at which the droplet meets the solid surface beneath it, measured from the surface under the center of the droplet. On the illuminated side of the droplet, the major voltage drops occurs in the insulator, causing a wetting force. The liquid curvature change due to the wetted surface decreases the inner pressure which can be estimated from the Young-Laplace equation [20]. Higher pressure on the dark side of the droplet prompts the droplet to move toward the light spot. The shifting of relative impedance values between the photoconductor and the insulator determines where the major voltage drop occurs, and hence the thickness of each layer should be carefully designed to generate the maximum photoconductivity ratio (i.e., high light-to-dark conductivity ratio).

The minimum droplet size is primarily constrained by the electrode width. In one embodiment the average width of an electrode is 750 μm, and the space between the electrodes is 50 μm. In another embodiment the average electrode width is 1125 μm, and the space between the electrodes is 75 μm. Another embodiment has 525 μm electrodes and a 35 μm space. Other size ranges can be fabricated depending on the application. A controllable droplet should electrically connect to at least three electrodes in order to form one or more different loops on each side. The droplet need not completely cover three electrodes, but should provide an electrical connection to three electrodes. The embodiment having 750 μm average width interdigitated electrodes can manipulate a droplet having a diameter of approximately 1600 μm or more.

For analyzing the droplet actuation in a systematic way, an equivalent circuit for FIG. 2 can be expressed as $$U_{OEW} = U\left(\frac{\frac{1}{i\omega C_i}}{\frac{2}{i\omega C_i} + \frac{R_w}{1 + i\omega C_w} + \frac{2R_{ph}}{1 + i\omega C_{ph}}}\right),$$

where U is the driving potential, $C_i$, $C_w$, and $C_{ph}$ are the capacitances of the insulator, the droplet, and the photoconductor, respectively, $R_w$, and $R_{ph}$ are the resistances of the droplet and the photoconductor, respectively, and ω denotes the driving angular frequency. The hydrophobic coating (Teflon AF1600) used to maintain a high contact angle) (~118°) is usually relatively thin, thus being excluded from the calculation for simplicity.

Figure 3:
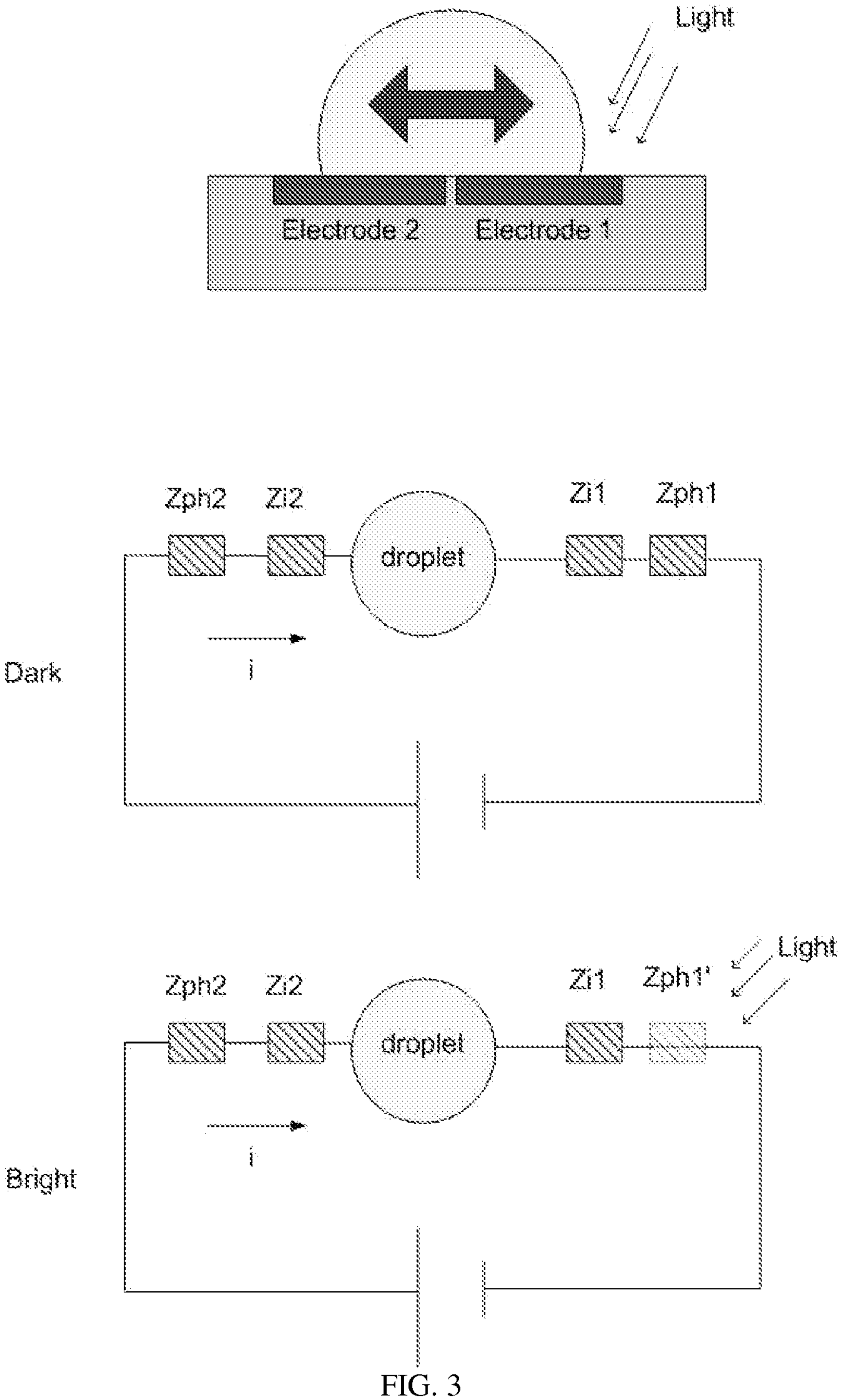
FIG. 3 shows a droplet covering two electrodes and the resulting circuit with and without illumination on one side of the droplet.
Figure 4:
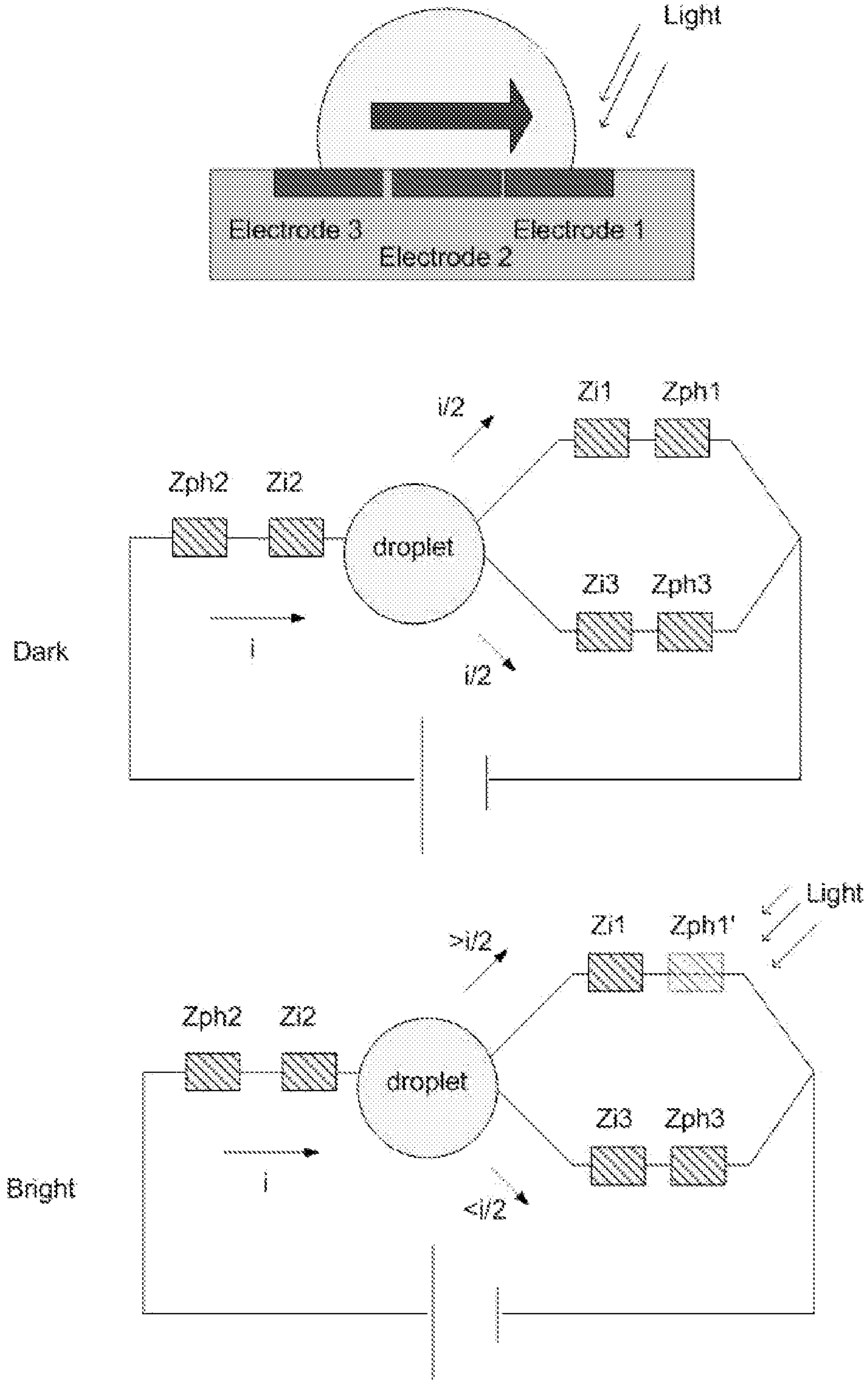
FIG. 4 shows a droplet covering three electrodes and the resulting circuit with and without illumination on one side of the droplet.

FIGS. 3 and 4 illustrate a droplet covering two and three electrodes, respectively, and the corresponding circuits with and without illumination on one side of the droplet. Zph is the impedance of a portion of the photoconductor above a given electrode, and Zi is the impedance of a portion of the insulator above a given electrode. The numerals correspond to the associated electrode. When a droplet covers only two electrodes, the light-induced impedance change in one photoconductor causes the current to change by the same amount on each side of the droplet, and thus the voltages across the two insulators remain equal while the voltage across the illuminated photoconductor is less than the voltage across the non-illuminated photoconductor. When a droplet covers at least three electrodes, the current is different on one side of the droplet than on the other, as indicated in FIG. 4, and the illuminated side becomes more hydrophilic than the other.

Figure 5:
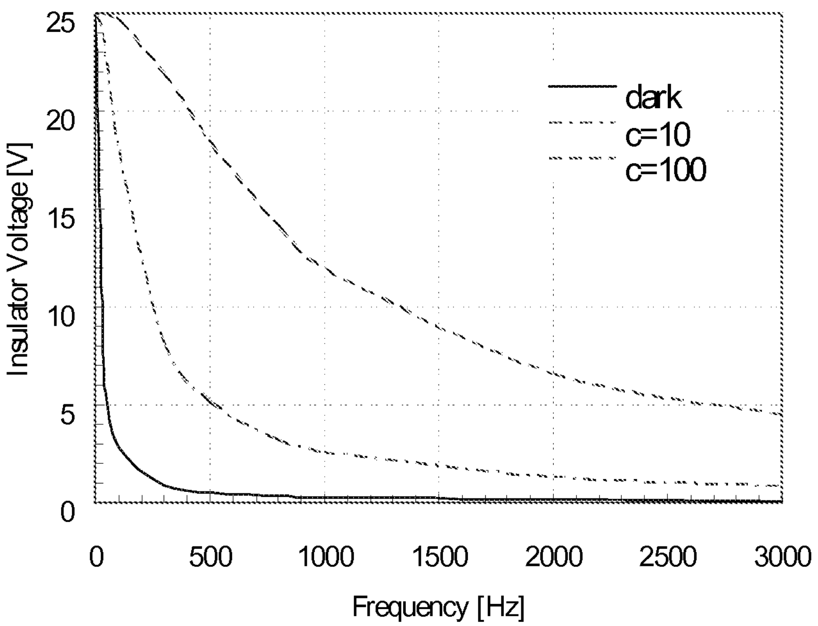
FIG. 5 shows the voltage drop in the insulator versus driving frequency. The notation "c" denotes the photoconductivity ratio (light-to-dark conductivity ratio). The optimal operational region yields the maximum photoconductivity ratio. The driving voltage in the example is 50 $V_{rms}$ and the operational bandwidth is between 100 Hz and 800 Hz. Frequencies out of the range can induce limited or no OEW effect.

The relationship between the voltage drop across the insulator and the driving frequency is exhibited in FIG. 5. The objective is to seek a frequency which can provide the maximum photoconductivity ratio. The voltage drop declines rapidly as the frequency increases and no significant difference between the dark and bright states is observed at low frequencies (<<100 Hz), resulting in a narrow bandwidth available for manipulation. Compared to experimental observations (10<c<100), the preferred bandwidth based on the current setup falls between 100 Hz and 800 Hz. An increase in light intensity may also enlarge the photoconductivity ratio.

An evaluation of contact angle measurement was conducted. A potential of 37 $V_{rms}$ at 100 Hz was applied on a liquid droplet (water). The illumination source was a laser generating 15 mW/$cm^2$ at 670 nm, and it was used for both actuation and contact angle measurements. A contact angle reduction of 24° was experimentally observed. More information regarding experimental and theoretical analyses can be obtained from the works of Chiou et al. and Inui [22, 23].

Figure 6:
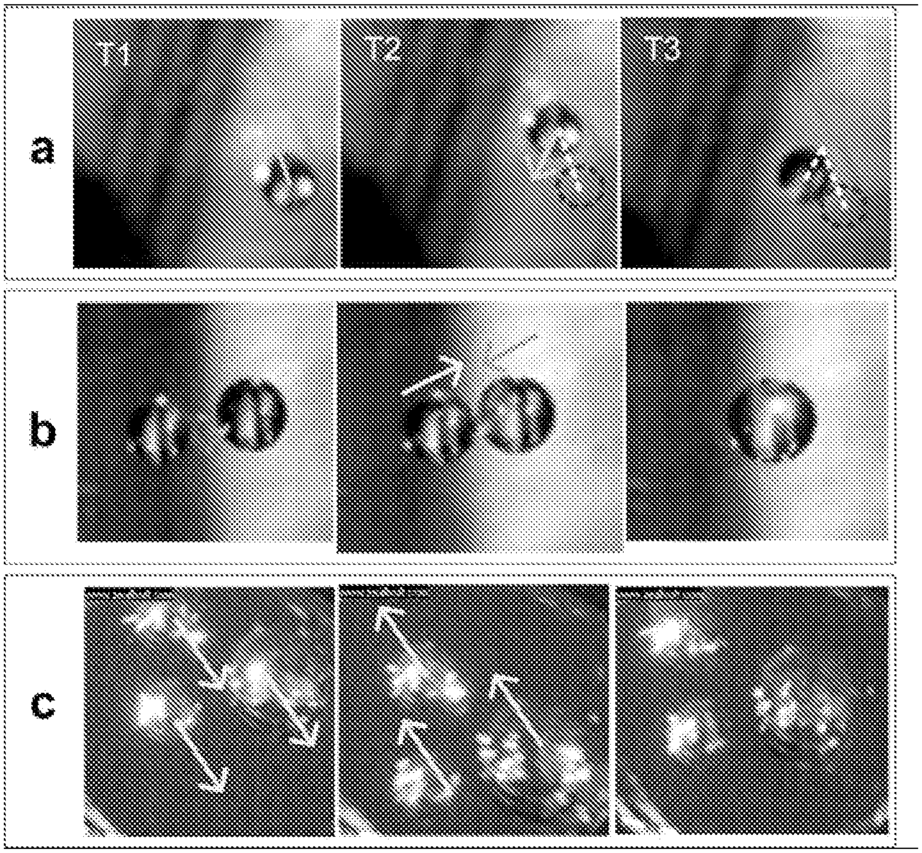
FIG. 6 shows basic droplet manipulations using an o-OEW device and a driving voltage of 42 Vrms at 500 Hz.

FIG. 6 demonstrates fluid transport utilizing o-OEW. In FIG. 6A, the laser spot is placed so as to cause a droplet to move up and left then down and left. In FIG. 6B, the laser spot is placed between two droplets, and the wetting force attracts these two droplets toward each other and causes them to merge. In FIG. 6C, three laser beams were shone on three separate droplets to move them simultaneously. The movement of the droplet in such a triangle path (FIG. 6A) manifests free movement in all directions on the surface. Translational speeds up to 3.6 mm/s were experimentally measured.

Figure 7:
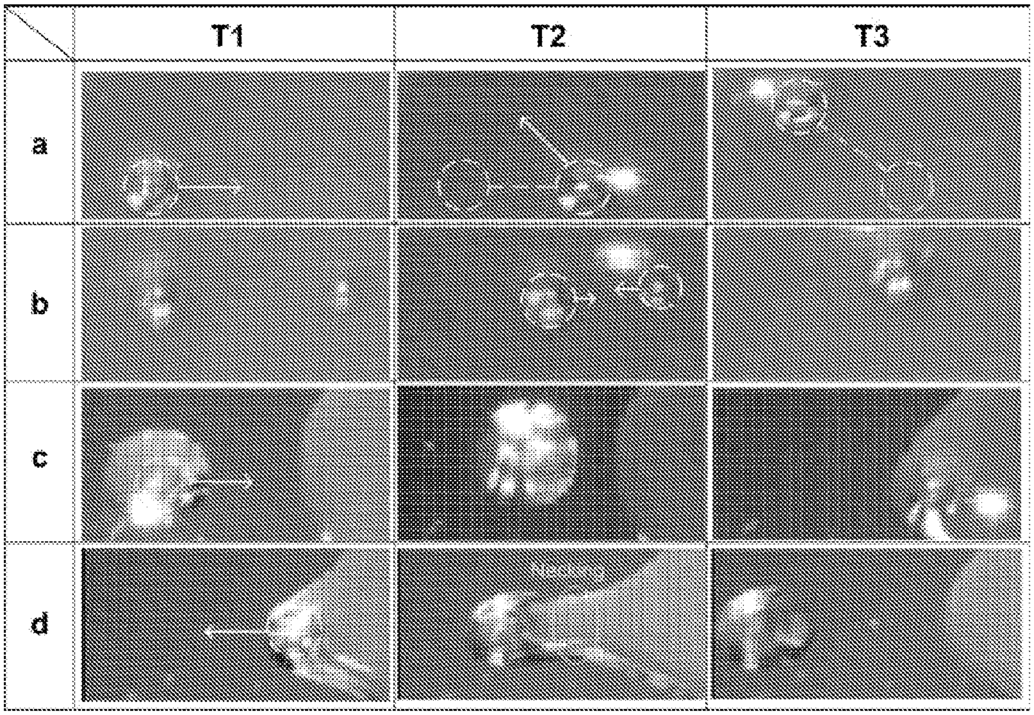
FIG. 7 shows basic droplet manipulations with droplets immersed in silicone oil. The driving voltage in the example is 35 Vrms at 310 Hz and the droplet volume is 10 μL.

To minimize the surface stiction resulting from hysteresis and prevent evaporation, droplets can be immersed in low-viscous (1 cst) silicone oil (Silicone 200 Fluids, Dow Corning). The mobility of droplets improves with silicone oil. FIG. 7 shows basic droplet manipulations with droplets immersed in silicone oil, with a driving voltage of 35 Vrms at 310 Hz, and a droplet volume of 10 μL. A maximum translational speed of 5 mm/s was measured. The manipulations demonstrated in FIGS. 6A and 6B were repeated with the droplets immersed in silicone oil as shown in FIGS. 7A and 7B. The reduction of hysteresis and surface stiction allow low illumination power consumption, i.e., a 3 mW laser pointer or an LED, for inducing an optoelectrowetting effect. The surface tensions of both water/Teflon and oil/Teflon interfaces are higher than that of water/oil, so a water droplet can act as a handle to merge and split silicone oil as shown in FIGS. 7C and 7D. A volume of silicone oil sufficient to surround the droplet is preferred in order to prevent evaporation and minimize surface stiction, but more silicone oil may be used.

Figure 8:
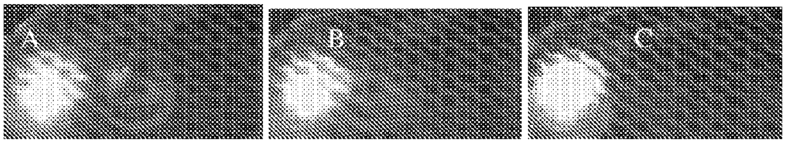
FIG. 8 shows a 20 μL, droplet moving from an initial position towards an illuminated site on a chip having transparent electrodes.

The use of titanium (Ti) for the electrodes makes it necessary for the laser/steering beam to come in from the top. However, the metal can be replaced by a translucent or transparent conductive material, such as indium tin oxide (ITO), thus enabling the laser beam to come in from the bottom (flat side of the droplet). FIG. 8 shows a chip with transparent electrodes and a transparent substrate. The series of images illustrate movement of a droplet with illumination from the bottom side. In FIG. 8, a back-side white light source illuminates the region next to the droplet and attracts the droplet to move toward the energized spot. Backside illumination can provide homogeneous illumination and prevent uneven scattering of the droplet. Backside illumination can also provide use of an addressable illumination device, such as an LCD panel.

A test without potential supply was also conducted to observe the possible actuation resulting from the Marangoni effect. No displacement was measured under such circumstances and the temperature increase due to the laser heating was too small (<0.1° C.) to be measured.

Figure 9:
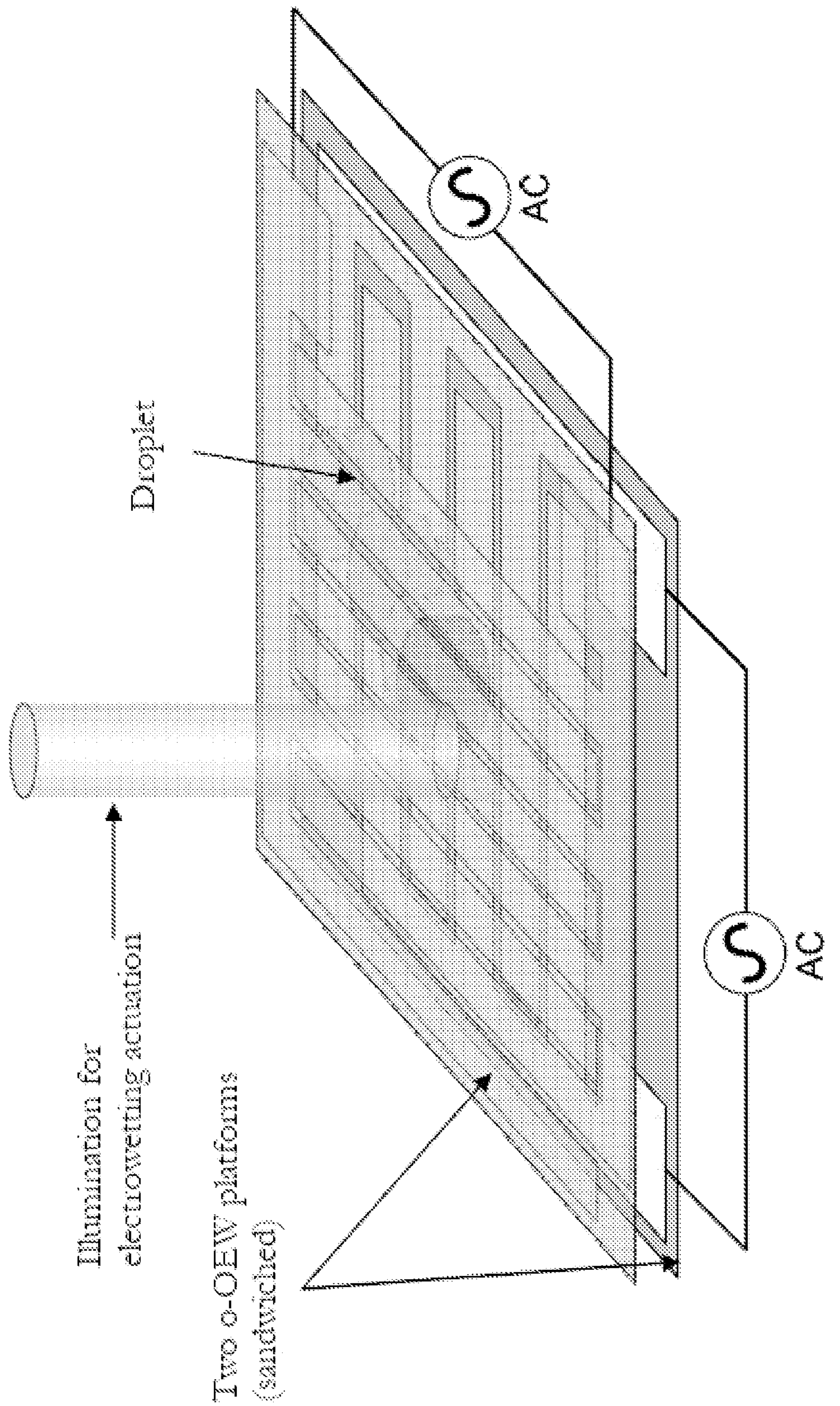
FIG. 9 shows a sandwiched configuration created from two o-OEW platforms. The two o-OEW platforms have separate AC supplies.
Figure 10:
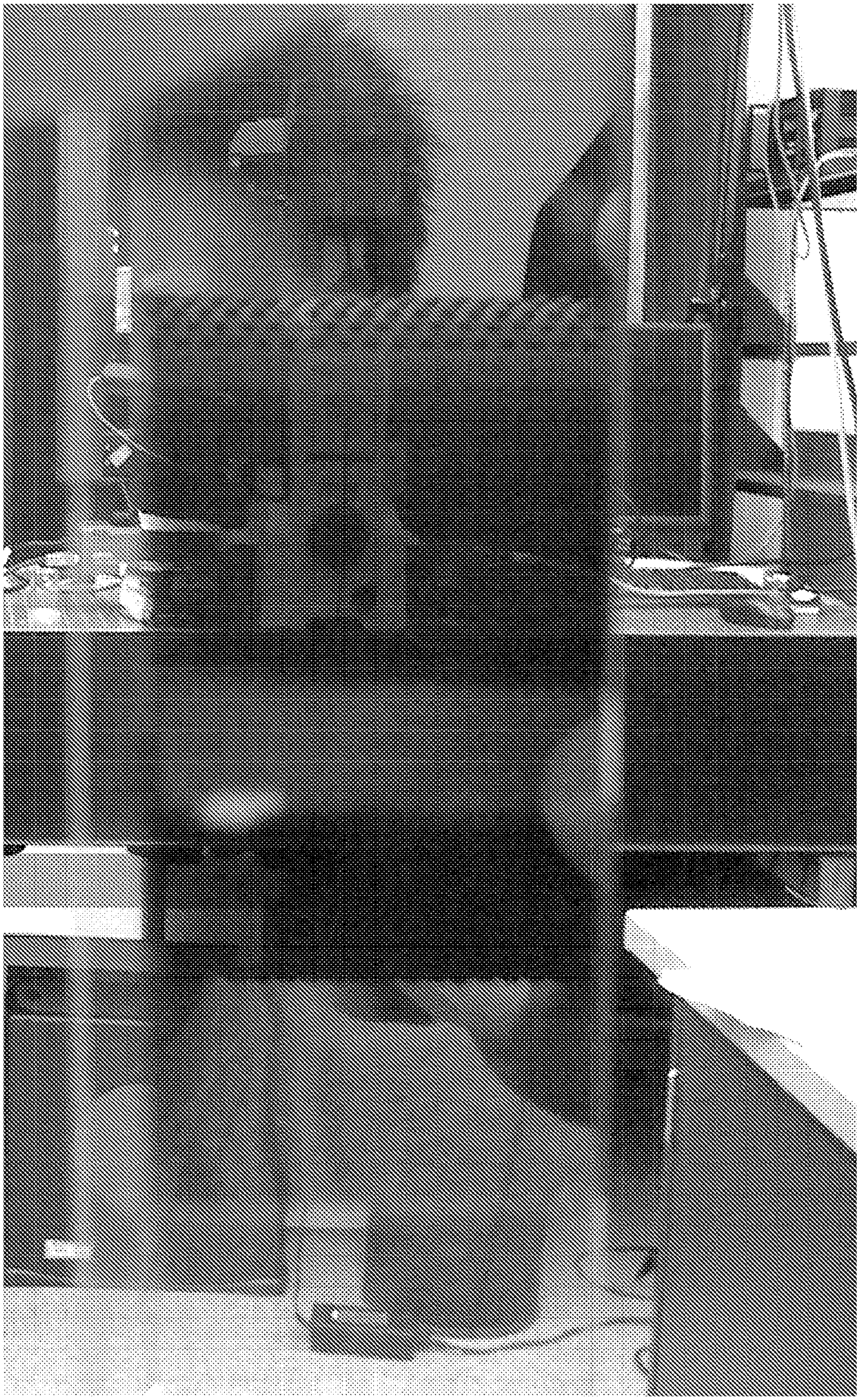
FIG. 10 shows a transparent o-OEW chip fabricated on a glass substrate with indium tin oxide (ITO) electrodes. The brownish color is due to the deposition of amorphous Si (a-Si), which is a photoconductor.

FIG. 9 shows an embodiment in which a sandwiched configuration is created by the use of two open configuration optoelectrowetting platforms. This allows for equal actuation force to be exerted on a droplet when light is shone on it from the top or bottom. At least one of the open optoelectrowetting platforms should be fabricated on a transparent substrate, e.g., glass, with transparent electrodes, e.g., indium tin oxide, to allow optical access. FIG. 10 shows a transparent o-OEW chip fabricated on a glass substrate with indium tin oxide (ITO) electrodes. The brownish color is due to the deposition of amorphous Si (a-Si), which is a photoconductor.

The two platforms are sandwiched so that the hydrophobic layer of the first platform is adjacent to the hydrophobic layer of the second platform. A spacer may be used between the two platforms. The space between the two platforms contains the droplet to be actuated and should allow the droplet to contact both platforms. The space between the platforms may include, but is not limited to, between 50 μm and 500 μm. Larger spacings up to the nominal diameter of the droplet are suitable in certain applications. Preferably, the two platforms are sandwiched such that their electrodes are in a cross-configuration so that the elongate electrodes of the first platform are perpendicular to the elongate electrodes of the second platform as illustrated in FIG. 9. In the disclosed embodiment the two platforms have separate AC supplies that are multiplexed so that the platforms are not simultaneously charged.

The sandwiched configuration has attributes of an open optoelectrowetting device in that it comprises two o-OEW platforms, each having its own driving and reference electrodes on the same side of a droplet and capable of being energized independently for droplet manipulation. The driving and reference electrodes on each platform are preferably substantially coplanar. However, other single-sided electrode configurations are contemplated.

The sandwiched configuration may have one or more windows in one of the platforms. The windows are void areas of the platform which do not contain a substrate, electrodes, conductive layer, photoconductive layer, dielectric layer or hydrophobic layer. The windows allow physical access to the droplet which may be useful for operations such as removing a droplet or adding material to a droplet.

Figure 11:
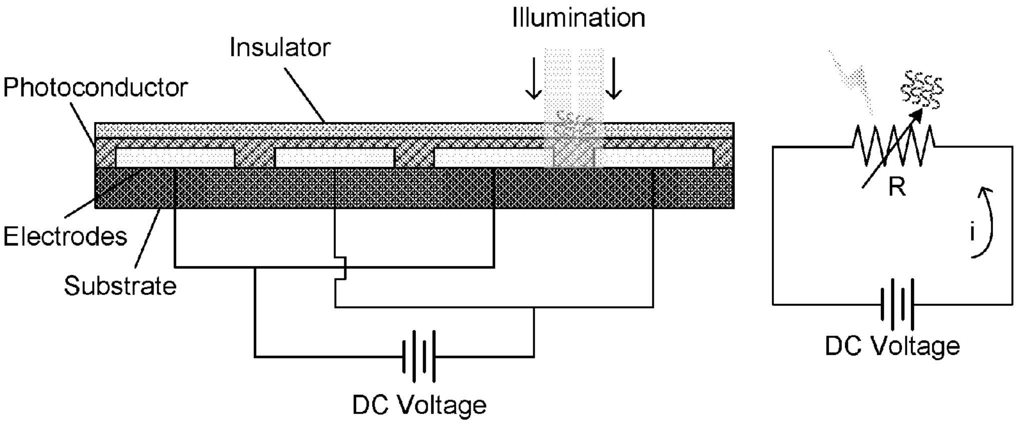
FIG. 11 shows a platform coupled to a DC current source for heating a droplet and the resulting circuit diagram.
Figure 12:
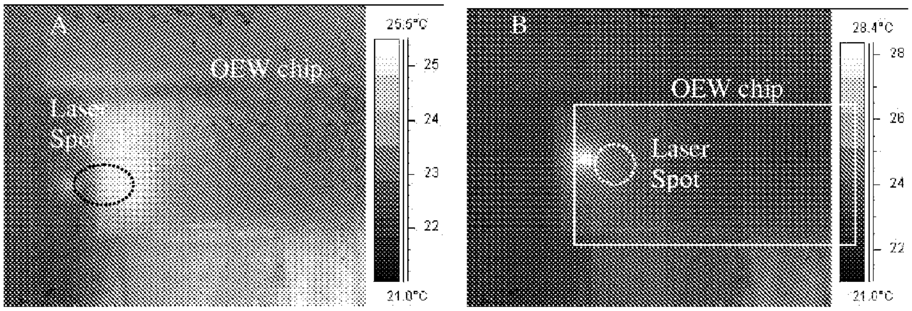
FIG. 12 shows the heating effect from a light source focused off the o-OEW chip (12A) and on the o-OEW chip (12B).

In some applications the ability to heat a droplet may be advantageous, e.g., PCR. Heating a sample can be accommodated with either a single o-OEW platform, as shown in FIG. 11, or with a sandwiched configuration. By varying the resistance in a circuit, the temperature is changed accordingly. The photoconductor in the o-OEW chip is treated as a variable resistor. The resistance is altered in response to the light illumination. A strong light intensity results in a high heating temperature due to less resistance but more current and vice versa. FIG. 12 illustrates this effect. When the laser spot hits somewhere outside the chip, the temperature increase due to laser heating is only one or two degrees above the background (FIG. 12A). In contrast, the temperature increase becomes more significant when the laser spot is inside the chip due to the resultant Joule heating from the increase in current through the photoconductor (FIG. 12B).

The heating effect is directly related to the photoconductive change of a photoconductor. A photoconductor that can induce a large photoconductive ratio is preferred. The energy gap of a material affects the absorbed wavelength and the efficiency. Two materials have been tested under a visible light source (20 mW He—Ne laser, $\lambda$=632 nm). Pure amorphous silicon ($\alpha$-Si) without dopants induces a photoconductive ratio that is less than the photoconductive ratio of amorphous silicon with dopants, such as hydrogen molecules. The maximum photoconductive change is about 30-fold while the minimum resistance is thousands of kilohms. The heating efficiency of amorphous silicon is counteracted by the high resistance. Cadmium sulfide (CdS) is another suitable photoconductor due to its excellent response to the visible light. The maximum photoconductive ratio of cadmium sulfide can reach 1000-fold and the minimum resistance can be as low as several hundred ohms Cadmium sulfide is a photoconductor suitable for heating a droplet with a single o-OEW platform or with a sandwiched configuration. Cadmium sulfide can increase in temperature 2-3° C./s under the flood illumination of a 100 W halogen lamp. Temperature change will vary depending on the intensity of illumination. Temperature changes more slowly when an amorphous silicon photoconductor is used compared to a cadmium sulfide photoconductor.

Different photoconductors may be used within the photoconductive layer so that some areas of the platform contain a first photoconductor and other areas of the platform contain a second photoconductor. This configuration can be useful when a specific area of the chip is to be dedicated to heating.

The droplet may be heated using either AC or DC current, although DC is preferred. A signal generator may be coupled to an o-OEW platform so as to selectively provide DC or AC current or a combination thereof, e.g., a signal having an AC component and a zero or nonzero DC component or bias. A signal generator can provide the flexibility of using an AC current for droplet actuation and a DC current for droplet heating without having to couple the o-OEW platform to a different type of current source. Alternatively, separate DC and AC current sources may be attached to the platform.

Although amorphous silicon and cadmium sulfide are disclosed in this application for use as photoconductors, other photoconductors may be used provided a light source is selected which is suitable for exciting the photoconductor. Organic photoconductors may be used in applications where some flex or bending in the platform is desirable.

The present invention provides a unique technique of droplet actuation using an open configuration OEW with coplanar electrodes and a photoconductor. The results overcome the deficiencies of the current OEW, leading to a complete programmable LoC system.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected.

REFERENCES

Incorporated Herein by Reference

1. M. G. Pollack, R. B. Fair and A. D. Shenderov, Appl. Phys. Lett. 77, 1725 (2000).
2. J. Zeng and T. Korsmeyer, Lab Chip 4, 265-277 (2004).
3. S. K. Cho, H. Moon, and C. J. Kim, Journal Of Microelectromechanical Systems 12(1), 70-80 (2003).
4. S. Y. Teh, R. Lin, L. H. Hung, and A. P. Lee, Lab Chip 8, 198-220 (2008).
5. O. D. Velev, B. G. Prevo, and K. H. Bhatt, NATURE 426(4), 515-516 (2003).
6. K. T. Kotz, Y. Gu, and G. W. Faris, J. AM. CHEM. SOC. 127, 5736-5737 (2005).
7. R. D. Sun, A. Nakajima, A. Fujishima, T. Watanabe, and K. Hashimoto, J. Phys. Chem. B 105, 1984-1990 (2001).
8. D. Beyssen, L. L. Brizouala, O. Elmazriaa, and P. Alnot, Sensors and Actuators B: Chemical 118, (1-2) 380-385 (2006).
9. K. L. Wang, T. B. Jones, and A. Raisanen, J. Micromech. Microeng. 17, 76-80 (2007).
10. H. Moona, S. K. Cho, R. L. Garrell, and C. J. Kim, Journal Of Applied Physics 92(7), 4080-4087 (2002).
11. A. Sukhanova, Y. Volkov, A. L. Rogach, A. V. Baranov, A. S. Susha, D. Klinov, V. Oleinikov, J. H. M. Cohen, I. Nabiev, Nanotechnology 18, (2007).
12. Y. H. Chang, G. B. Lee, F. C. Huang, Y. Y. Chen, J. L. Lin, Biomed Microdevices 8, 215-225 (2006).
13. S. K. Cho and C. J. Kim, IEEE Conf. MEMS, Kyoto, Japan, Jan. 686-689 (2003).
14. S. K. Fan, C. Hashi, and C. J. Kim, IEEE Conf. MEMS, Kyoto, Japan, 694-697 (2003).
15. P. Y. Chiou, H. Moon, H. Toshiyoshi, C. J. Kim and M. C. Wu, Sensors and Actuators A: Physical, 104(3), 222-228 (2003).
16. C. G. Cooney, C. Yi. Chen, M. R. Emerling, A. Nadim, J. D. Sterling, Microfluid Nanofluid 2, 435-446 (2006).
17. U. C. Yi and C. J. Kim, J. Micromech. Microeng. 16, 2053-2059 (2006).
18. A. Torkkeli, VTT publications, Vantaa, Finland (2003).
19. J. Wu, R. Yue, X. Zeng, M. Kang, Z. Wang, L. Liu, Proceedings of the 1st IEEE International Conference on Nano/Micro Engineered and Molecular Systems January 18-21, Zhuhai, China (2006).
20. H. D. Young, Physics, 8th ed. (Addison-Wesley) (1992).
21. P. Y. Chiou, A. T. Ohta, and M. C. Wu, Nature 436, 370-372 (2005).
22. P. Y. Chiou, Z. Chang, and M. C. Wu, J. Microelectromechanical Systems 17(1), 133-138 (2008).
23. N. Inui, "Relationship Between Contact Angle of Liquid Droplet and Light Beam Position in Optoelectrowetting," *Sensors and Actuators A: Physical*, Vol 140, No. 1, Oct. 1, 2007, pp. 123-130.
24. Park, S.-Y. et al., "Light-Driven Microfluidic Platforms for Droplet-Based Biochemical Analysis," *Optical Trapping and Optical Micromanipulation VI.*, Dholakia, Kishan; Spalding, Gabriel C., Eds., Proceedings of the SPIE, Volume 7400 (2009)., pp. 74000U-74000U-10.
25. Kumar, A. et al., "A Novel Optically Driven Electrokinetic Technique for Manipulating Nanoparticles," *Optical Trapping and Optical Micromanipulation VI.* Dholakia, Kishan; Spalding, Gabriel C., Eds., Proceedings of the SPIE, Volume 7400 (2009)., pp. 74000V-74000V-8.
26. Han-Sheng Chuang, "Pneumatically-Driven Elastomeric Devices for a Programmable Lab on a Chip and Applications," Ph.D. Dissertation, Purdue University, West Lafayette, Ind., 2010.
27. Stuart Joseph Williams, "Optically Induced, AC Electrokinetic Manipulation of Colloids," Ph.D. Dissertation, Purdue University, West Lafayette, Ind., 2009.
28. Aloke Kumar, "Dynamic Manipulation by Light and Electric Fields: Colloidal Particles to Droplets," Ph.D. Dissertation, Purdue University, West Lafayette, Ind., 2010.
29. U.S. patent application Ser. No. 12/404,866, filed Mar. 16, 2009.
30. U.S. patent application Ser. No. 12/261,622, filed Oct. 30, 2008.

We claim:

1. An open optoelectrowetting (OEW) device for liquid droplet actuation, comprising:

a substrate;

a conductive layer with a plurality of substantially coplanar driving and reference electrodes in an interdigitated alternating pattern on said substrate, said plurality of driving electrodes and said plurality of reference electrodes are arranged in a single row, said plurality of driving electrodes being electrically connected in parallel and said plurality of reference electrodes being electrically connected in parallel for connection to respective terminals of an AC voltage source;

a photoconductive layer on said conductive layer; a dielectric layer on said photoconductive layer; and a hydrophobic layer on said dielectric layer.

2. The open OEW device of claim 1, wherein said electrodes are electrically connected to a liquid droplet suitable for OEW actuation, said at least three electrodes cooperating with said droplet to define at least two subcircuits.

3. The open OEW device of claim 1, wherein said plurality of driving electrodes and said plurality of reference electrodes are transparent.

4. The open OEW device of claim 3, wherein said plurality of driving electrodes and said plurality of reference electrodes include indium tin oxide.

5. The open OEW device of claim 3, wherein said substrate is transparent.

6. The open OEW device of claim 1, wherein said hydrophobic layer and said dielectric layer are transparent.

7. The open OEW device of claim 1, wherein at least one driving electrode and at least one reference electrode are electrically connected through the photoconductive layer, the dielectric layer, and the hydrophobic layer to a liquid droplet suitable for OEW actuation.

8. The open OEW device of claim 1, wherein:

each electrode in the plurality of substantially coplanar driving and reference electrodes is elongate having a long side, and the plurality of substantially coplanar driving and reference electrodes is arranged in a single row such that the long sides of the driving electrodes are adjacent to and parallel with the long sides of the reference electrodes.

9. An open optoelectrowetting (OEW) device for liquid droplet actuation, comprising:

a first AC voltage source having first and second terminals;

a first substrate;

a first conductive layer with a first plurality of substantially coplanar elongate driving and reference electrodes in an interdigitated alternating pattern on said substrate, said plurality of driving electrodes and said plurality of reference electrodes are arranged in a single row, said first plurality of elongate driving electrodes being electrically connected in parallel to said first terminal and said first plurality of elongate reference electrodes being electrically connected in parallel to said second terminal;

a first photoconductive layer on said first conductive layer;

a first dielectric layer on said first photoconductive layer; and a first hydrophobic layer on said first dielectric layer.

10. The open OEW device of claim 9, further comprising a droplet electrically connected to at least three of said electrodes, said at least three electrodes cooperating with said droplet to define at least two subcircuits.

11. The open OEW device of claim 9, wherein said plurality of driving electrodes and said plurality of reference electrodes are arranged in a single row.

12. The open OEW device of claim 9, wherein said plurality of driving electrodes and said plurality of reference electrodes are transparent.

13. The open OEW device of claim 12, wherein said plurality of driving electrodes and said plurality of reference electrodes include indium tin oxide.

14. The open OEW device of claim 12, wherein said substrate is transparent.

15. The open OEW device of claim 9, wherein said hydrophobic layer and said dielectric layer are transparent.

* * * * *